Patented Nov. 8, 1932

1,886,365

UNITED STATES PATENT OFFICE

OTTO BAYER, OF FRANKFORT-ON-THE-MAIN, WILHELM HOHENEMSER, OF FRANKFORT-ON-THE-MAIN-FECHENHEIM, AND KARL LARBIG, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

NEW SULPHUR-DYESTUFFS AND A PROCESS OF PREPARING THEM

No Drawing. Application filed November 7, 1930, Serial No. 494,182, and in Germany November 19, 1929.

The present invention relates to new sulphur-dyestuffs and to a process of preparing them.

It is already known to use certain metal compounds as additions during the preparation of sulphur dyestuffs. According to Lange: "Die Schwefelfarbstoffe II," ed. 1925, there may be added, for instance, copper, zinc, manganese or iron compounds.

Now, we have found that sulphur-dyestuffs of a remarkable intensity of color and shade can be made by sulphurizing a parent material suitable for the preparation of sulphur-dyestuffs in the presence of a compound of a metal of the group consisting of vanadium, uranium, tungsten, antimony and molybdenum. Starting materials for the preparations of sulphur dyestuffs are nitrophenols, aminophenols, indophenols, leuco-indophenols, azines and the like. In some cases it has proved advantageous to carry out the melting process in the presence of a mixture of one of the said metal compounds with another metal compound, especially a copper compound, or in the presence of a complex compound of one of the said metal compounds with another metal compound.

The dyestuffs obtainable according to this invention still contain the metal added during the sulphurization process; however, it is not known in which form the metal is present. They are of an extraordinary intensity of color and shade in comparison with the corresponding hitherto known dyestuffs prepared without the said additions. Thus, for instance, when melting a suitable azine compound with a sulphurizing agent according to our process, red tints are obtainable which hitherto could not be produced in the group of sulphur-dyestuffs.

In locating the substituents in the phenazine compounds disclosed in some of the following examples and claims we employ the numbering of positions as shown in the following formula:

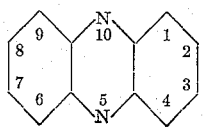

The following examples illustrate the invention, but they are not intended to limit it thereto, the parts being by weight:

1) 44 parts of alpha-naphthylamine and 35 parts of para-aminophenol are condensed in the usual manner with sodium hypochlorite solution so as to form indophenol. The latter is reduced by means of sodium sulphide, whereupon the leuco indophenol is precipitated by means of sodium bi-carbonate. The paste thus obtained is introduced into a solution of 150 parts of crystallized sodium sulphide and 100 parts of water of 50° C. When the whole is dissolved, further 150 parts of sodium sulphide are added and the solution is heated to 80° C. Thereupon, a solution of 20 parts of ammonium molybdate in 50 parts of water is added and subsequently 110 parts of sulphur are introduced. The whole is heated to boiling and concentrated by evaporation until the boiling point of 122° C. to 124° C. is reached. At this temperature boiling is continued under reflux, until no more unchanged indophenol can be detected. The dyestuff is separated in the usual manner. There is obtained a product which dyes cotton from a sodium sulphide containing bath a vivid and intense bluish green tint. When no molybdate is added in the above process, a product is obtained yielding considerably more blue and more dull tints; by addition of copper salts a product is obtained yielding more yellow and more dull tints.

2) 42 parts of leuco indophenol, obtainable from 1-tolyl-aminonaphthalene-8-sulphonic acid and para-aminophenol, are boiled under reflux for 70 hours with 58 parts of concentrated sodium sulphide, 47 parts of sulphur, 15 parts of ammonium molybdate and 125 parts of alcohol. 125 parts of water are then added, the alcohol is distilled off and, by addition of water, the solution is made up to 1250 parts. The dyestuff is then precipitated by passing a current of air through the solution at 50° C. It forms in the dry state a dark powder which dyes cotton very vivid bluish green tints.

3) 60 parts of crystallized sodium sulphide and 26 parts of sulphur are molten together and 7.5 parts of molybdic acid are added. Into this melt there are gradually introduced 15 parts of 3-amino-7-hydroxyphenazine and the whole is heated under reflux until the formation of the dyestuff is terminated. The crude melt may either be used directly for dyeing or the dyestuff may be isolated in the usual manner by precipitation by means of acid or air. The dyestuff dyes cotton beautiful reddish tints.

4) 7.5 parts of molybdenum sulphide are introduced, while stirring, into polysulphide prepared from 60 parts of crystallized sodium sulphide and 26 parts of sulphur. 15 parts of 3-amino-7-hydroxyphenazine are then added and the whole is worked up as described in Example 3. A dyestuff is obtained which is very similar to that obtainable according to Example 3. It yields, however, tints which are not quite so red as those obtainable by means of the dyestuff of Example 3.

5) 20 parts of sulphur are dissolved in 50 parts of crystallized sodium sulphide and 4.5 parts of the molybdic acid are added. Thereupon 15 parts of 2-methyl-3-amino-6.8-dichloro-7-hydroxyphenazine are introduced and the whole is worked up as in Example 3. The dyestuff obtained dyes cotton beautiful reddish tints.

6) 48 parts of sulphur are dissolved in 96 parts of crystallized sodium sulphide and after addition of 4 parts of molybdic acid 10 parts of 2-methyl-3-amino-7-hydroxy-5-ethylphenazine are introduced. The whole is then heated until the formation of the dyestuff is finished. The dyestuff obtained dyes cotton reddish tints.

7) When proceeding as in Example 6, but adding besides the ingredients used in that Example 1 part of copper sulphate, a dyestuff is obtained which is very similar to that obtainable according to Example 6.

8) 15 parts of 2-methyl-3-amino-7-hydroxy-5-ethylphenazine are introduced into a solution of 108 parts of crystallized sodium sulphide and 54 parts of sulphur at 90° C.–95° C., a concentrated aqueous solution of 10 parts of sodium tungstate is added and the whole is heated, after evaporation of the water, up to the boiling point of 130° C. in the course of 30 hours and for about 10 hours at 130° C. Thereupon, the melt is diluted by addition of water to 500 parts and air is blown in at 80° C. until the dyestuff is precipitated completely. It forms in the dry state a violet powder and dyes cotton from the bath a vivid bluish red tint. By substituting 17 parts of uranyl nitrate for the sodium tungstate and proceeding in the same manner, a dyestuff of a very similar tint is obtained.

When using 7 parts of ammonium molybdate instead of the above mentioned metal salts, a dyestuff is obtained yielding a considerably more vivid and more yellowish tint. When replacing the sodium tungstate by 5 parts of ammonium vanadate, a dyestuff is obtained yielding less vivid and more violetish tints.

9) 17 parts of 2-methyl-3-amino-7-hydroxy-5-ethylphenazine used in Example 8 are introduced at about 100° C in a 50% paste form into a solution a polysulphide prepared from 63 parts of crystallized sodium sulphide and 30 parts of sulphur at 120° C. A concentrated aqueous solution of 3 parts of copper sulphate and 3 parts of ammonium molybdate is then added and the whole is heated in the course of 5 hours up to the melting point of 120° C. and then for 10 hours at 140° C.–145° C. After cooling, the melt is pulverized and yields a dyestuff dyeing cotton from the sodium sulphide bath a vivid red tint.

10) Into a solution of 150 parts of crystallized sodium sulphide 72 parts of sulphur and 20 parts of neutral sodium phosphate 20 parts of 2-methyl-3-amino-7-hydroxy-5-ethylphenazine in paste form are introduced at about 100° C. and heated for 40 hours to 130° C. The mixture is worked up as indicated in Example 8. The dyestuff likewise dyes vivid red tints.

11) By using in Example 10 instead of the sodium phosphate 15 parts of potassium-antimonyl-tartrate and proceeding in the manner indicated in that example, a dyestuff of a very similar tint is obtained.

12) 80 parts of crude cresol are boiled under reflux together with 190 parts of crystallized sodium suphide, 75 parts of sulphur and 10 parts of ammonium molybdate at 120° C. for 2 hours. After evaporation, the whole is heated for 7 hours to 220° C., for 2 hours to 240° C. and for 2 hours to 250° C. and subsequently dissolved in 3000 parts of water. The dyestuff is then precipitated by means of hydrochloric acid. It dyes cotton from the sodium sulphide bath vivid brown tints.

We claim:

1. In the process of preparing sulphur-dyestuffs by melting an organic compound being a starting material for the preparation of sulphur-dyestuffs with an alkali metal polysulphide the step which comprises carrying out the melting process in the presence of a compound of a metal of the group consisting of molybdenum, tungsten, vanadium, uranium and antimony.

2. In the process of preparing sulphur-dyestuffs by melting a phenazine compound with an alkali metal polysulphide the step which comprises carrying out the melting process in the presence of a compound of a metal of the group consisting of molybdenum, tungsten, vanadium, uranium, and antimony.

3. In the process of preparing sulphur-dyestuffs by melting a phenazine of the following general formula:

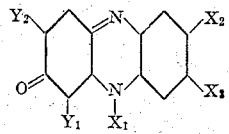

wherein
X₁ stands for hydrogen or alkyl
X₂ stands for hydrogen or alkyl and
X₃ for hydrogen or amino, and
Y₁ and Y₂ stand for hydrogen or halogen
with an alkali metal polysulphide the step which comprises carrying out the melting process in the presence of an inorganic molybdenum compound.

4. In the process of preparing sulphur-dyestuffs by melting a phenazine of the following general formula:

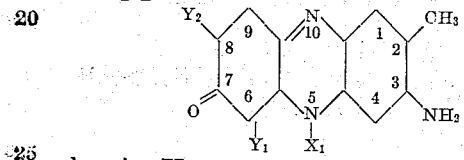

wherein X₁ stands for hydrogen or ethyl
Y₁ and Y₂ stand for hydrogen or chlorine
with an alkali metal polysulphide the step which comprises carrying out the melting process in the presence of an inorganic molybdenum compound.

5. The process which comprises melting 2-methyl-3-amino-6.8-dichloro-7-oxy-phenazine with sodium polysulphide in the presence of molybdic acid.

6. The process which comprises melting 2-methyl-3-amino-7-oxy-5-ethylphenazine with sodium polysulphide in the presence of molybdic acid and copper sulphate.

7. The process which comprises melting 2-methyl-3-amino-7-oxy-5-ethyl-phenazine with sodium polysulphide in the presence of ammonium molybdate and copper sulphate.

8. As new products, the sulphur-dyestuffs which are obtainable by melting an organic compound being a starting material for the preparation of sulphur dyestuffs with an alkali metal polysulphide in the presence of a compound of a metal of the group consisting of molybdenum, tungsten, vanadium, uranium and antimony.

9. As new products, the sulphur-dyestuffs which are obtainable by melting a phenazine compound with an alkali metal polysulphide in the presence of a compound of a metal of the group consisting of molybdenum, tungsten, vanadium, uranium and antimony.

10. As new products, the sulphur-dyestuffs which are obtainable by melting a phenazine of the following general formula:

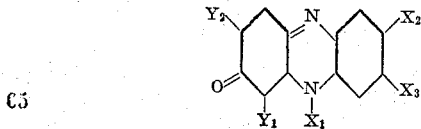

wherein X₁ stands for hydrogen or alkyl
X₂ for hydrogen or alkyl
X₃ for hydrogen or amino
Y₁ and Y₂ stand for hydrogen or halogen
with an alkali metal polysulphide in the presence of an inorganic molybdenum compound.

11. As new products, the sulphur-dyestuffs which are obtainable by melting a phenazine of the following general formula:

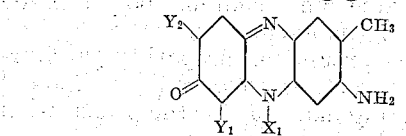

wherein X₁ stands for hydrogen or ethyl
Y₁ and Y₂ stand for hydrogen or chlorine
with an alkali metal polysulphide in the presence of an inorganic molybdenum compound.

12. As a new product, the sulphur-dyestuff which is obtainable by melting 2-methyl-3-amino-6.8-dichloro-7-oxy-phenazine with sodium polysulphide in the presence of a molybdic acid.

13. As a new product, the sulphur-dyestuff which is obtainable by melting 2-methyl-3-amino-7-oxy-5-ethyl-phenazine with sodium polysulphide in the presence of ammonium molybdate.

14. As new products, sulphur-dyestuffs obtained from an organic compound being a starting material for the preparation of sulphur dyestuffs and a polysulphide and containing a metal of the group consisting of molybdenum, tungsten, vanadium, uranium and antimony.

15. As new products, sulphur-dyestuffs obtained from a phenazine and an alkali metal polysulphide and containing a metal of the group consisting of molybdenum, tungsten, vanadium, uranium and antimony.

16. As new products, sulphur-dyestuffs obtained from a phenazine of the following general formula:

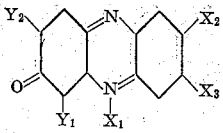

wherein X₁ stands for hydrogen or alkyl
X₂ for hydrogen or alkyl
X₃ for hydrogen or amino
Y₁ and Y₂ stand for hydrogen or halogen
and an alkali metal polysulphide and containing molybdenum.

17. As new products, sulphur-dyestuffs obtained from a phenazine of the following general formula:

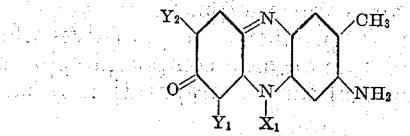

wherein $X_1$ stands for hydrogen or ethyl $Y_1$ and $Y_2$ stand for hydrogen or chlorine and an alkali metal polysulphide and containing molybdenum.

18. As a new product, the sulphur-dyestuff obtained from 2-methyl-3-amino-6.8-dichloro-7-oxy-phenazine and sodium polysulphide and containing molybdenum.

19. As a new product, a sulphur-dyestuff obtained from 2-methyl-3-amino-7-oxy-5-ethyl-phenazine and sodium polysulphide and containing molybdenum.

20. In the process of preparing sulphur-dyestuffs by melting an organic compound being a starting material for the preparation of sulphur-dyestuffs with an alkali metal polysulphide the step which comprises carrying out the melting process in the presence of a molybdenum compound and a copper compound.

21. In the process of preparing sulphur-dyestuffs by melting a phenazine of the following general formula:

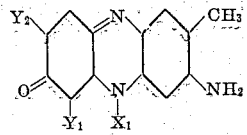

wherein $X_1$ stands for hydrogen or ethyl, $Y_1$ and $Y_2$ stand for hydrogen or chlorine, with an alkali metal polysulphide the step which comprises carrying out the melting process in the presence of an inorganic molybdenum compound and an inorganic copper compound.

22. As new products, the sulphur-dyestuffs which are obtainable by melting an organic compound being a starting material for the preparation of sulphur-dyestuffs with an alkali metal polysulphide in the presence of a molybdenum compound and a copper compound.

23. As new products, the sulphur-dyestuffs which are obtainable by melting a phenazine of the following general formula:

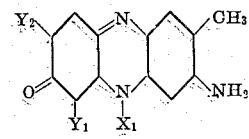

wherein $X_1$ stands for hydrogen or ethyl, $Y_1$ and $Y_2$ stand for hydrogen or chlorine, with an alkali metal polysulphide in the presence of an inorganic molybdenum compound and an inorganic copper compound.

24. As a new product, the sulphur-dyestuff which is obtainable by melting 2-methyl-3-amino-7-oxy-5-ethylphenazine with sodium polysulphide in the presence of ammonium molybdate and copper sulphate.

25. As new products, sulphur-dyestuffs obtained from an organic compound being a starting material for the preparation of sulphur-dyestuffs and a polysulphide and containing molybdenum and copper.

26. As new products, sulphur-dyestuffs obtained from a phenazine of the following general formula:

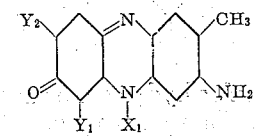

wherein $X_1$ stands for hydrogen or ethyl, $Y_1$ and $Y_2$ stand for hydrogen or chlorine, and an alkali polysulphide and containing molybdenum and copper.

27. As a new product, a sulphur-dyestuff obtained from 2-methyl-3-amino-7-oxy-5-ethyl-phenazine and sodium polysulphide and containing molybdenum and copper.

In testimony whereof, we affix our signatures.

OTTO BAYER.
WILHELM HOHENEMSER.
KARL LARBIG.